US007542177B2

United States Patent
Kondoh

(10) Patent No.: US 7,542,177 B2
(45) Date of Patent: Jun. 2, 2009

(54) IMAGE READING DEVICE AND SHADING CORRECTING METHOD FOR THE SAME

(75) Inventor: Makio Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 778 days.

(21) Appl. No.: 10/934,449

(22) Filed: Sep. 7, 2004

(65) Prior Publication Data

US 2005/0083544 A1   Apr. 21, 2005

(30) Foreign Application Priority Data

Sep. 16, 2003   (JP) .............................. 2003-323147

(51) Int. Cl.
*H04N 1/40* (2006.01)
*G06F 15/00* (2006.01)

(52) U.S. Cl. ....................... 358/461; 347/129; 358/474; 362/539

(58) Field of Classification Search ................. 358/461, 358/448, 443, 400, 1.16, 1.17, 474, 471, 358/518, 500; 135/87, 88.02, 88.01; 347/129, 347/112, 111; 362/539, 538, 303, 305; 388/907.5, 388/910, 916; 712/233, 241
See application file for complete search history.

(56) References Cited

U.S. PATENT DOCUMENTS

| 4,811,113 | A |   | 3/1989 | Ozeki et al. .................. 382/245 |
| 5,412,489 | A | * | 5/1995 | Hirota ......................... 358/461 |
| 5,907,628 | A | * | 5/1999 | Yolles et al. ................ 382/149 |

* cited by examiner

*Primary Examiner*—Mark K Zimmerman
*Assistant Examiner*—Louie Cao
(74) *Attorney, Agent, or Firm*—Oblon, Spivak, McClelland, Maier & Neustadt, P.C.

(57) ABSTRACT

An image reading device of the present invention reads a reference white plate before an actual document image in order to generate shading correction data. As for the first line, an input data determining circuit unconditionally determines that input data is normal. A sum data selecting circuit selects input data if the input data is normal or selects a value stored in a white data storage if otherwise. A sum data calculating means forcibly makes data output from white sum data storage (logical) ZERO, i.e., black data and then writes the result of calculation in the above storage. As for the second and successive lines, a decision value calculating circuit calculates a noise decision value for each pixel by using the white data of a previous line stored in the white data storage. The input data determining means compares the noise decision value and input image data to thereby determine whether or not the input image data is normal.

30 Claims, 3 Drawing Sheets

IMAGE READING DEVICE AND SHADING CORRECTING METHOD FOR THE SAME

BACKGROUND OF THE INVENTION

1. Field of the Invention

The present invention relates an image reading device for use in a digital copier, a facsimile apparatus, a scanner or the like. More particularly, the present invention relates to an image reading device of the type reading an image with a one-dimensional line sensor by optically scanning a document surface and capable of correcting irregularity and other shading characteristics of read data with high accuracy and a shading correcting method for the same.

2. Description of the Background Art

Generally, when an image reading device installed in, e.g., a digital copier, a facsimile apparatus or a scanner reads a document, its output level is irregular even if the document is of the same color or the same density. This irregularity is a scribable to various causes including a difference in sensitivity between a plurality of pixels, which constitute an image sensor, aberration of a lens system and irregular illumination of a light source that illuminates a document. It is therefore a common practice with the image reading device to execute shading correction for electrically correcting a difference in output level between pixels.

A shading correcting method customary with the image reading device will be described hereinafter. A reference white plate, positioned in the vicinity of a document reading position, is illuminated before the actual document image so as to read the resulting reflection and store it as pixel-by-pixel shading correction data. To make such shading correction accurate, it is necessary that the shading correction data-derived from the reference white plate contains a minimum of noise with respect to the true level. For example, if the noise of the shading correction data is great, then image data read, but corrected by the shading correction data, becomes output image data effected by the noise of the shading correction data.

In light of the above, it is a common practice to minimize the influence of noise by generating shading correction data on the basis of a plurality of lines of data derived from the reference white plate. For example, shading correction data may be generated by simple averaging or weighted averaging executed with the plurality of lines of data, as taught in, e.g., Japanese Patent Laid-Open Publication Nos. 05-110848 and 11-289432. However, such a conventional shading correcting method has some problems left unsolved, as will be described specifically later.

Technologies relating to the present invention are also disclosed in, e.g., Japanese Patent Laid-Open Publication Nos. 2002-300393, 2002-300392 and 11-103390.

SUMMARY OF THE INVENTION

It is an object of the present invention to provide an image reading device capable of generating shading correction data having a high S/N (Signal-to-Noise) ratio and a shading correcting method for the same.

An image reading device of the present invention optically scans a document surface, generates, when reading a plurality of lines from a reference white plate with a one-dimensional image sensor, shading correction data on the basis of input data, and corrects, when reading a document image with the one-dimensional image sensor, input data with the shading correction data. The image reading device includes a first white sum data storing circuit for storing white sum data representative of a sum of white data of pixels derived from the reference white plate. A first white data storage stores white data of each pixel. A decision value calculating circuit calculates an input data decision value for each pixel on the basis of white data of a previous line stored in the first white data storage. An input data determining circuit compares the input data decision value and input data to thereby determine whether or not the input data is normal. A weighted averaging circuit selects, in accordance with the result of the above decision made by the input data determining circuit, either one of white data stored and input data and performs weighted averaging with the data stored or the input data and white data stored. A second white data storage stores the result of weighted averaging output from the weighted averaging circuit. A sum data selecting circuit selects either one of white data stored and input data in accordance with the result of the decision made by the input data determining circuit. A sum data calculating circuit adds the data stored or the input data selected by the sum data selecting circuit to the first sum data stored in the first white sum data storage. A second white sum data storage stores the result of the addition output from the sum data calculating circuit. A mean calculating circuit divides the white sum data stored by a number of lines added to thereby produce a mean value. A shading correction data storage stores the mean value output from the mean calculating circuit. A shading correcting circuit corrects the shading of the input data in accordance with the shading correction data stored. The shading correction data is generated by storing white data and white sum data, making, based on the white data, a decision on whether or not the input data is abnormal, selecting the data to be added in accordance with the result of the decision to thereby generate white sum data, and dividing, when the reference white plate is fully read, white sum data by the number of lines added.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
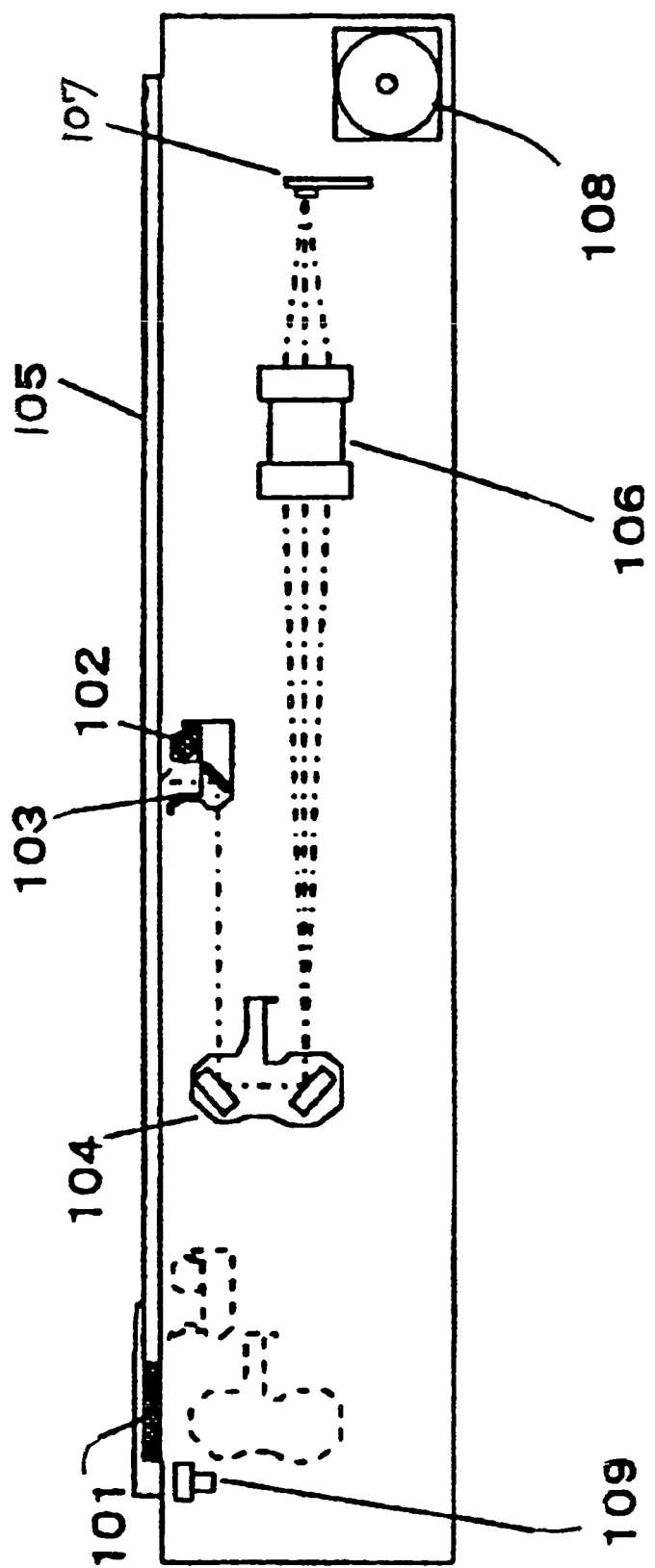
FIG. 1 is a view showing the general construction of an image reading device embodying the present invention.

To better understand the present invention, a conventional shading correcting method will be described with reference to FIG. 1. As shown, a reference white plate 101 is positioned in the vicinity of a document setting position, which is included in a scanner or image reading device, and read before the actual document image. The resulting reflection from the reference white plate 101 is read and stored as pixel-by-pixel shading correction data. At this instant, to make the data levels of individual pixels equal when a document of the same color or the same density is read, the image data of each pixel thus read is subject to the following correction:

$$Dsh(I) = 255 \times D(I)/Dw(I)$$

where I denotes a pixel number in the main scanning direction, D(I) denotes data read, Dw(I) denotes shading correction data, and Dsh(I) denotes shading-corrected data or output image data. The above equation assumes eight-bit reading.

To make the above shading correction accurate, it is necessary that the shading correction data derived from the reference white sheet 101 contains a minimum of noise with respect to the true level, as stated previously. For example, if the noise of the shading correction data is great, then image data read, but corrected by the shading correction data, becomes output image data effected by the noise. In light of this, it has been customary to generate shading correction data by simple averaging or weighted averaging, as also stated previously.

Simple averaging is represented by:

$$Dw(I)=[D(I,1)+D(I,2)+\ldots+D(I,N)]/N$$

where N denotes a number of lines added. More specifically, simple averaging adds image data up to the N-th line and then divides the resulting sum data by the number of lines N.

On the other hand, weighted averaging is represented by: first line: Dw (I,1)=[D(I,1)×(K−1)]/K Second and successive lines:

$$Dw(I,n)=[D(I,n)+(M-1)\times Dw(I,(n-1))]/M$$

where n denotes the n-th line and K and M each denote a particular weighting coefficient. More specifically, image data up to the N-th line are weighted and then averaged.

The simple averaging method stated above has a problem that a number of memories are necessary for generating the sum data. Although the weighted averaging method is practicable with a small number of memories, the noise of the last line critically effects the S/N ratio of the shading correction data Dw. Therefore, as far as the S/N ratio of the shading correction data Dw is concerned, the simple averaging method is advantageous over the weighted averaging method.

Further, not only random noise particular to a CCD (Charge Coupled Device) image sensor but also dust or similar extraneous matter often causes data read out from a reference white plate to locally, noticeably drop in level toward the black side. Shading correction data, generated on the basis of the data thus effected by dust, would contain noticeable noise. It is therefore necessary to exclude the data effected by dust when generating shading correction data. For this purpose, when data read out from a certain line is smaller than shading correction data Dw calculated up to the immediately preceding line by a preselected value, the weighted averaging method substitutes the data Dw generated up to the previous line for the data Dw of the current line, thereby excluding the data read out from the current line.

As stated above, the problem with the conventional simple averaging method is that an adequate criterion for excluding data effected by dust is not available because data stored in each memory is sum data. As a result, the S/N ratio of shading correction data is lowered when dust is deposited on a reference white plate. Consequently, neither the simple averaging method nor the weighted averaging method customarily practiced in the imaging art is fully satisfactory.

The image reading device and shading correcting method in accordance with the present invention, which solve the problems stated above, will be described with reference to the accompanying drawings hereinafter.

A specific configuration of the image reading device in accordance with the present invention will be describe with reference again made to FIG. 1. As shown, the image reading device includes a glass platen 105 and the reference white plate 101 mentioned earlier. A first carriage 103 is loaded with a lamp or light source 102 and a first mirror. A second carriage 104 is loaded with a second and a third mirror. A lens unit 106 is configured to focus a document image on a CCD image sensor mounted on an SBU 107. A scanner motor 108 is used to drive the first and second carriages 103 and 104.

In operation, after a document has been positioned on the glass platen 105, the lamp 102 is turned on. In this condition, the first and second carriages 103 and 104 are caused to move rightward, as seen in FIG. 1, by the scanner motor 108 while reading the document set on the glass platen 105.

Figure 2:
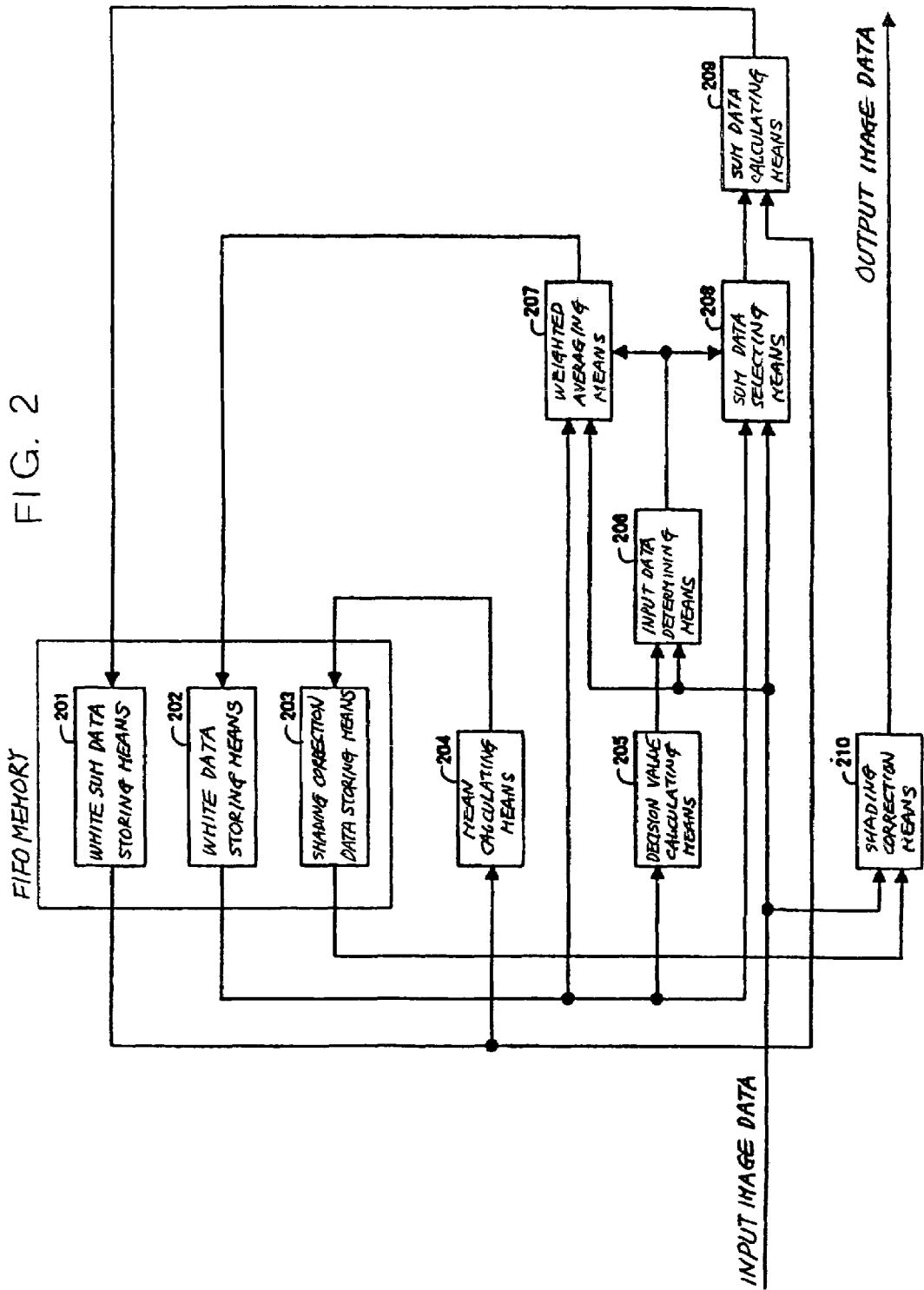
FIG. 2 is a schematic block diagram showing a specific configuration of a shading correction data generating circuit included in the illustrative embodiment.

FIG. 2 shows a first specific configuration of a shading correction data generating circuit in accordance with the present invention. As shown, the shading data generating circuit includes a FIFO (First-In First-Out) memory made up of white sum data storing means 201, white data storing means 202 and shading correction data storing means 203. The shading data generating circuit further includes mean calculating means 204, decision value calculating means 205, input data determining means 206, weighted averaging means 207, sum data selecting means 208, sum data calculating means 209, and shading correcting means 210.

A preferred embodiment of the shading correcting method in accordance with the present invention will be described with reference to FIGS. 1 and 2. First, to generate shading correction data, the input data determining means 206 unconditionally determines that image data derived from the first line of the reference white plate 101 is normal. The weighted averaging means 207 performs the following operation over the first line of data:

$$Ds(I,1)=[D(I,1)\times(K-1)]/K$$

where K denotes a weighting coefficient, I denotes a pixel number in the main scanning direction, D denotes input image data, and Ds denotes white data.

The result of the above operation, i.e., white data Ds(I,1) is written to the white data storing means 202.

The sum data selecting means 208 selects the input image data if the input data is normal, as determined by the input data determining means 206, or selects the white data stored in the white data storing means 202 if the input data is abnormal. In this case, the sum data calculating means 209 forcibly makes white sum data input thereto from the white sum data storing means 201 (logical) ZERO or black data and then performs the following operation over the first line of data:

$$Dw(I,1)=[D(I,1)+Dw(I,0)]$$

The result of the above operation Dw (I,1) is again written to the white sum storing means 201.

Now, as for the second and successive lines, the decision value calculating means (205) calculates a noise decision value pixel by pixel by using the white data of the previous line stored in the white data storing means 202. For example, the decision value calculating means 205 may subtract a preselected value stored in a register, not shown, from the white data of each pixel input thereto.

The input data determining means 206 compares the noise decision value output from the decision value calculating means 205 and input image data to thereby determine whether or not the input image data is normal. For example, the input data determining means 206 may determine that input image data is abnormal if it is smaller than the noise decision value.

The weighted averaging means 207 performs the following operation:

if input data is abnormal:

$$Ds(I,n)=Ds(I,(n-1))$$

if input data is normal:

$$Ds(I,n)=[D(I,n)+(M-1)\times Ds(I,(n-1))]/M$$

where n denotes a line, M denotes a weighting coefficient which may be varied every preselected number of lines, if desired.

The white data Ds(I,n) output from the weighted averaging means 207 is written to the white data storing means 202.

The sum data calculating means 209 repeats the following operation up to a preselected line, which is stored in a register not shown, while continuously making the output of the white sum data storing means 201 ZERO or black data:

if input data is abnormal:

$$Dw(I,n)=[Ds(I,(n-1))+Dw(I,(n-1))]$$

if input data is normal $$Dw(I,n)=[D(I,n)+Dw(I,(n-1))]$$

The data Dw thus output from the sum data calculating means 209 is written to the white sum data storing means 201.

It is to be noted that the sum data calculating means 209 uses the same equation because the sum data selecting means 208 selectively outputs D(I,n) or Ds(I,(n−1)) at the input data decision stage.

The sum data calculating means 209 forcibly makes the output data of the white sum data storing means 201 ZERO up to a preselected line, as stated above, for the following reason. If dust is present on the first line when the reference white plate 101 is read, it is necessary to exclude data derived from the first line from white sum data. For this purpose, the sum data calculating means 209 generates white data, which is scarcely effected by the dust, by weighted addition throughout a preselected number of lines and then cancels the forcible ZERO condition and starts producing white sum data.

By the procedure described so far, white sum data free from the influence of dust is stored in the white sum data storing means 201 at the end of reading of the reference white piece 101. On the line next to the line at which the above reading operation has ended, the mean calculating means 204 divides the white sum data stored in the white sum data storing means 201 by the number of lines added and writes the resulting data in the shading correction data storing means 203. The data thus stored in the correction data storing means 203 is the shading correction data having a high S/N ratio.

When a document is read by the image reading device, the shading correcting means 210 corrects the shading of input image data with the data stored in the shading correction data storing means 203 for thereby outputting shading-corrected image data.

An alternative embodiment of the shading correcting method in accordance with the present invention will be described with reference again made to FIGS. 1 and 2. The illustrative embodiment needs the memory of the white data storing means 202 and the memory of the white sum data storing means 201 when the image reading device is reading the reference white plate 101, but needs only the memory of the shading correction data storing means 203 when the device is reading an area other than the reference white plate 101, e.g., a document area. The total memory capacity of the white data storing means 202 and white sum data storing means 201 is greater than the memory capacity of the shading correction data storing means 203.

On the other hand, an MTF (Modulation Transfer Function) correction filter section or similar image processing section, not shown, that follows the image reading device does not need a memory assigned to image processing when dealing with the area of the white reference plate 101. Therefore, as for the area of the reference white plate 101, the memory of the shading correction data-storing means 203 or that of the image processing section can be used in place of the combination of the memory of the white data storing means 202 and that of the white sum data storing means 201. This allows the shading-corrected data with a high S/N ratio to be output by reducing or not increasing the memory capacity required.

Figure 3:
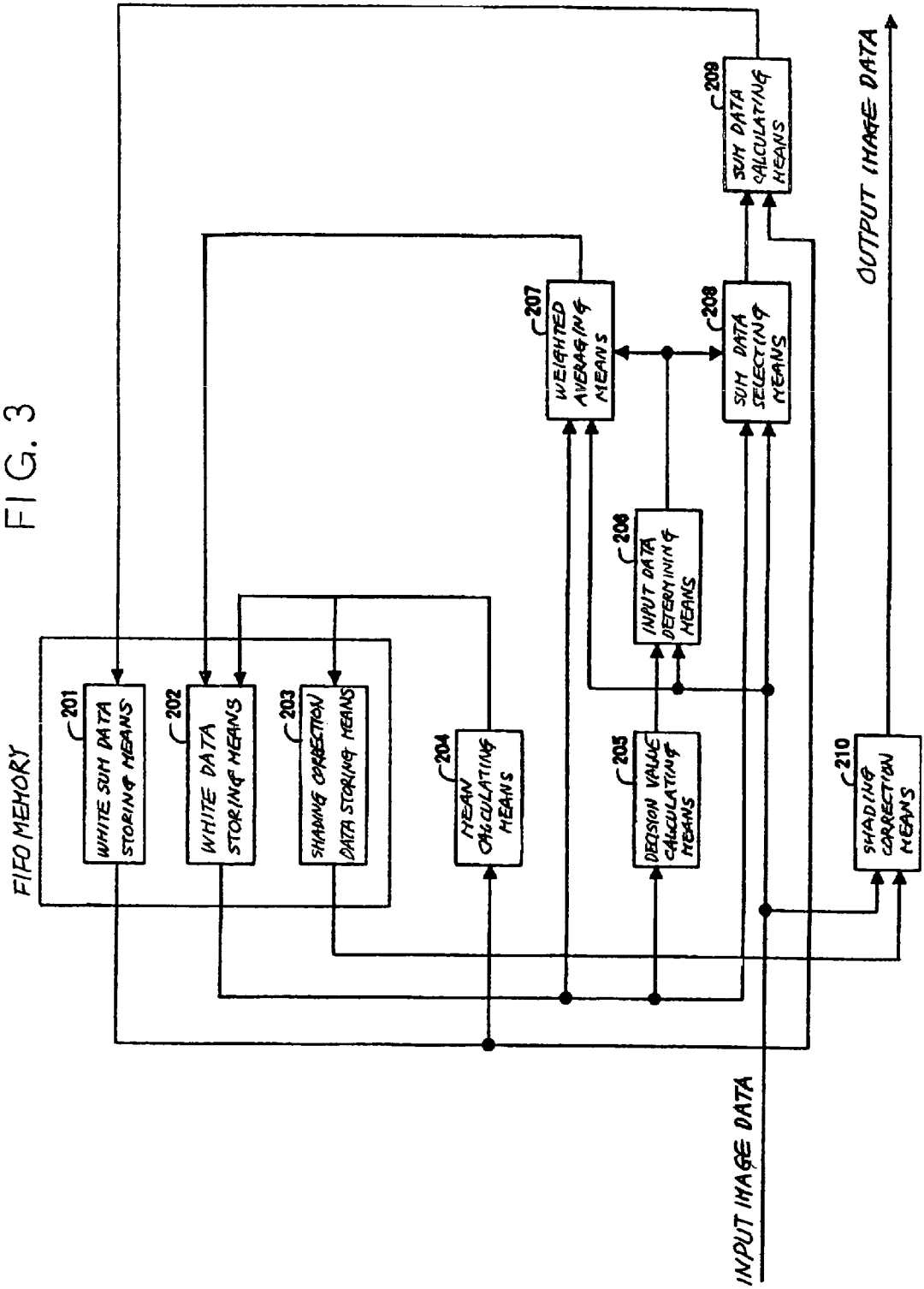
FIG. 3 is a schematic block diagram showing another specific configuration of the shading correction data generating circuit.

Another alternative embodiment of the shading correction method in accordance with the present invention will be described with reference to FIGS. 1 and 3. As shown, circuitry of FIG. 3 is identical with the circuitry of FIG. 2 except that the output of the mean calculating means 204 is not connected to the white data storing means 203. More specifically, in the illustrative embodiment, from a line appearing a predetermined number of lines after the line at which the addition of white sum data to the white sum data storing means 201 started, the output data of the mean calculating means 204 is input to the white data storing means 203 in place of the output data of the weighted averaging means 207 as data to be input to the white data storing means 203 after divided by the number of lines added. The illustrative embodiment thus uses data with a higher S/N ratio as reference data for the decision on noise cancellation for thereby further improving the S/N ratio of the shading correction data.

The embodiments shown and described may be modified, as will be described specifically hereinafter. In a first specific modification, the decision value calculating means 205 outputs a decision value by subtracting a preselected value, which may be fixed or set by a register, from the data stored in the white data storing means 202. In this case, the input data determining means 206 determine that input data is abnormal if the input data is smaller than the result of the above subtraction, i.e., lies on the black data side. By so determining whether or not the input data is effected by dust, this modification is also successful to generate shading correction data with a high S/N ratio.

In a second specific modification, the decision value calculating means 205 multiplies the data stored in the white data storing means 202 by a preselected ratio and outputs the resulting product as a decision value. The input data determining means 206 determines that input data is abnormal if the input data is smaller than the above product, i.e., lies on the black data side. This is also successful to cancel noise for thereby generating shading correction data with a high S/N ratio.

A third specific modification replaces the stored white data with a mean value of stored white data preceding and following a subject pixel by a preselected distance or larger one or smaller one of them. With this configuration, it is also possible to output shading correction data with a high S/N ratio by canceling noise.

In summary, it will be seen that the present invention provides an image reading device capable of generating shading correction data having an unprecedented high S/N ratio by reducing or not increasing memory capacity required.

Various modifications will become possible for those skilled in the art after receiving the teachings of the present invention without departing from the scope thereof.

What is claimed is:

1. An image reading device for optically scanning a document surface, generating, when reading a plurality of lines from a reference white plate with a one-dimensional image sensor, shading correction data on the basis of input data, and correcting, when reading a document image with said one-dimensional image sensor, input data with said shading correction data, said image reading device comprising:

first white sum data storing means for storing white sum data representative of a sum of white data of pixels derived from the reference white plate;

first white data storing means for storing white data of each pixel;

decision value calculating means for calculating an input data decision value for each pixel on the basis of white data of a previous line stored in said first white data storing means;

input data determining means for comparing the input data decision value and the input data to thereby determine whether or not said input data is normal;

weighted averaging means for selecting, in accordance with a result of a decision made by said input data determining means, either one of white data stored and input data and performing weighted averaging with said data stored or said input data and white data stored;

second white data storing means for storing a result of weighted averaging output from said weighted averaging means;

sum data selecting means for selecting either one of white data stored and input data in accordance with the result of the decision made by said input data determining means;

sum data calculating means for adding the data stored or the input data selected by said sum data selecting means to the first sum data stored in said first white sum data storing means;

second white sum data storing means for storing a result of an addition output from said sum data calculating means;

mean calculating means for dividing the white sum data stored by a number of lines added to thereby produce a mean value;

shading correction data storing means for storing the mean value output from said mean calculating means; and shading correcting means for correcting shading of the input data in accordance with the shading correction data stored;

wherein the shading correction data is generated by storing white data and white sum data, making, based on said white data, a decision on whether or not the input data is abnormal, selecting the data to be added in accordance with a result of said decision to thereby generate white sum data, and dividing, when the reference white plate is fully read, white sum data by a number of lines added.

2. A shading correcting method for an image reading device for optically scanning a document surface, generating, when reading a plurality of lines from a reference white plate with a one-dimensional image sensor, shading correction data on the basis of input data, and correcting, when reading a document image with said one-dimensional image sensor, input data with said shading correction data, said shading correcting method comprising:

a first white sum data storing step of storing white sum data representative of a sum of white data of pixels derived from the reference white plate;

a first white data storing step of storing white data of each pixel;

a decision value calculating step of calculating an input data decision value for each pixel on the basis of white data of a previous line stored in said first white data storing step;

an input data determining step of comparing the input data decision value and the input data to thereby determine whether or not said input data is normal;

a weighted averaging step of selecting, in accordance with a result of a decision made in said input data determining step, either one of white data stored and input data and performing weighted averaging with said data stored or said input data and white data stored;

a second white data storing step of storing a result of weighted averaging output in said weighted averaging step;

a sum data selecting step of selecting either one of white data stored and input data in accordance with the result of the decision made in said input data determining step;

a sum data calculating step of adding the data stored or the input data selected in said sum data selecting step to the first sum data stored in said first white sum data storing step;

a second white sum data storing step of storing a result of an addition output in said sum data calculating step;

a mean calculating step of dividing the white sum data stored by a number of lines added to thereby produce a mean value;

a shading correction data storing step of storing the mean value output in said mean calculating step; and a shading correcting step of correcting shading of the input data in accordance with the shading correction data stored;

wherein the shading correction data is generated by storing white data and white sum data, making, based on said white data, a decision on whether or not the input data is abnormal, selecting the data to be added in accordance with a result of said decision to thereby generate white sum data, and dividing, when the reference white plate is fully read, white sum data by a number of lines added.

3. The method as claimed in claim 2, wherein said white sum data storing step and said white data storing step use at least one of a memory included in an image processing section and a memory assigned to said shading correction data storing step.

4. The method as claimed in claim 3, wherein the sum data starts being added a preselected number of lines after a line at which the white data starts being stored by weighted averaging.

5. The method as claimed in claim 4, wherein from a preselected line a preselected number of lines after a start of addition of the white sum data, the result of calculation output in said mean calculating step is stored in said white data storing step in place of the result of calculation output from said weighted averaging step.

6. The method as claimed in claim 5, wherein said decision value calculating step produces a decision value produced by subtracting a preselected value from a stored white data value, and said input data determining step determines, when input data is smaller than the decision value and lies on a black data side, that said input data is abnormal.

7. The method as claimed in claim 6, wherein said decision value calculating step produces a decision value by multiplying a stored white data value by a preselected ratio, and said input data determining step determines, when input data is smaller than the decision value, that said input data is abnormal and lies on a black data side.

8. The method as claimed in claim 7, wherein the preselected ratio is 1 or below.

9. The method as claimed in claim 8, wherein the stored white data value is replaced with any one of a mean value of stored white data values preceding and following a subject pixel by a preselected distance and a larger one and a smaller one of said stored white data values.

10. The method as claimed in claim 2, wherein the sum data starts being added a preselected number of lines after a line at which the white data starts being stored by weighted averaging.

11. The method as claimed in claim 10, wherein from a preselected line a preselected number of lines after a start of addition of the white sum data, the result of calculation output in said mean calculating step is stored in said white data storing step in place of the result of calculation output from said weighted averaging step.

12. The method as claimed in claim 11, wherein said decision value calculating step produces a decision value produced by subtracting a preselected value from a stored white data value, and
said input data determining step determines, when input data is smaller than the decision value and lies on a black data side, that said input data is abnormal.

13. The method as claimed in claim 12, wherein said decision value calculating step produces a decision value by multiplying a stored white data value by a preselected ratio, and
said input data determining step determines, when input data is smaller than the decision value, that said input data is abnormal and lies on a black data side.

14. The method as claimed in claim 13, wherein the preselected ratio is 1 or below.

15. The method as claimed in claim 14, wherein the stored white data value is replaced with any one of a mean value of stored white data values preceding and following a subject pixel by a preselected distance and a larger one and a smaller one of said stored white data values.

16. The method as claimed in claim 2, wherein from a preselected line a preselected number of lines after a start of addition of the white sum data, the result of calculation output in said mean calculating step is stored in said white data storing step in place of the result of calculation output from said weighted averaging step.

17. The method as claimed in claim 16, wherein said decision value calculating step produces a decision value produced by subtracting a preselected value from a stored white data value, and
said input data determining step determines, when input data is smaller than the decision value and lies on a black data side, that said input data is abnormal.

18. The method as claimed in claim 17, wherein said decision value calculating step produces a decision value by multiplying a stored white data value by a preselected ratio, and
said input data determining step determines, when input data is smaller than the decision value, that said input data is abnormal and lies on a black data side.

19. The method as claimed in claim 18, wherein the preselected ratio is 1 or below.

20. The method as claimed in claim 19, wherein the stored white data value is replaced with any one of a mean value of stored white data values preceding and following a subject pixel by a preselected distance and a larger one and a smaller one of said stored white data values.

21. The method as claimed in claim 2, wherein said decision value calculating step produces a decision value produced by subtracting a preselected value from a stored white data value, and
said input data determining step determines, when input data is smaller than the decision value and lies on a black data side, that said input data is abnormal.

22. The method as claimed in claim 21, wherein said decision value calculating step produces a decision value by multiplying a stored white data value by a preselected ratio, and
said input data determining step determines, when input data is smaller than the decision value, that said input data is abnormal and lies on a black data side.

23. The method as claimed in claim 22, wherein the preselected ratio is 1 or below.

24. The method as claimed in claim 23, wherein the stored white data value is replaced with any one of a mean value of stored white data values preceding and following a subject pixel by a preselected distance and a larger one and a smaller one of said stored white data values.

25. The method as claimed in claim 2, wherein said decision value calculating step produces a decision value by multiplying a stored white data value by a preselected ratio, and
said input data determining step determines, when input data is smaller than the decision value, that said input data is abnormal and lies on a black data side.

26. The method as claimed in claim 25, wherein the preselected ratio is 1 or below.

27. The method as claimed in claim 26, wherein the stored white data value is replaced with any one of a mean value of stored white data values preceding and following a subject pixel by a preselected distance and a larger one and a smaller one of said stored white data values.

28. The method as claimed in claim 2, wherein the preselected ratio is 1 or below.

29. The method as claimed in claim 28, wherein the stored white data value is replaced with any one of a mean value of stored white data values preceding and following a subject pixel by a preselected distance and a larger one and a smaller one of said stored white data values.

30. A shading correcting method, comprising:
storing white sum data representative of a sum of white date of pixels derived from a reference white object;
storing white data of each pixel;
calculating an input data decision value for each pixel on the basis of the white data of a previous line which has been stored;
comparing the input data decision value and the input data to determine whether said input data is normal;
selecting, in accordance with whether said input data has been determined to be normal, either one of white data stored and input data, performing weighted averaging with said data stored or said input data and white data stored, and generating a result of the weighted averaging;
storing the result of the weighted averaging;
selecting either one of white data stored and input data in accordance with whether said input data has been determined to be normal;
adding the white data stored or the input data selected in the selecting step to the white sum data which has been stored and generating an adding result;
storing the adding result;
dividing the adding result by a number of lines added to obtain a mean value;
storing the mean value; and
correcting shading of the input data in accordance with the mean value.

* * * * *